Oct. 1, 1963    R. M. CREEGAN    3,105,765
EVACUATED COFFEE PACKAGE
Filed Feb. 19, 1962    2 Sheets-Sheet 1

INVENTOR
ROBERT M. CREEGAN
BY Frederick F. Mack,
Michael J. Quillinan and
Walter D. Ames    ATTORNEYS

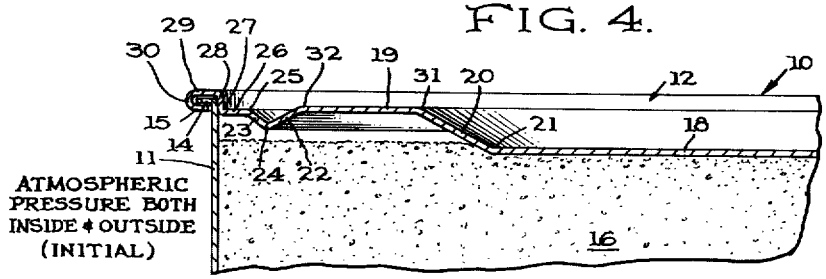
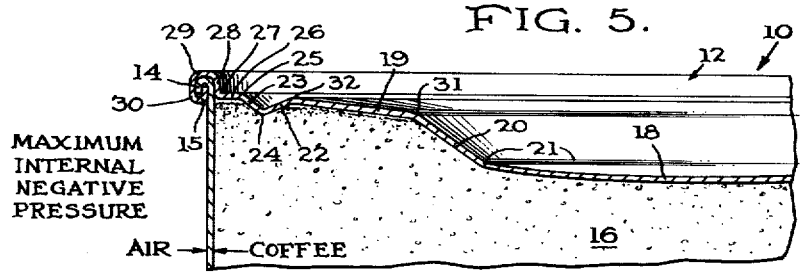
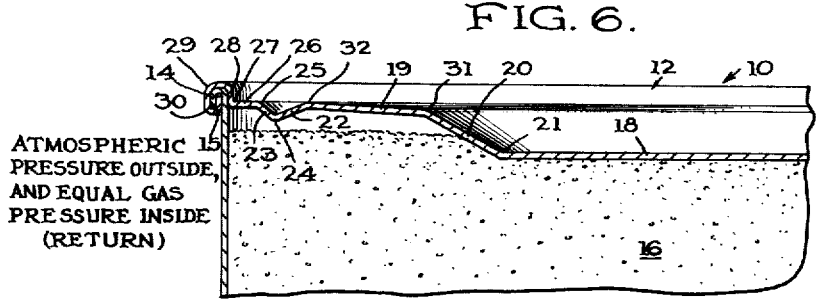
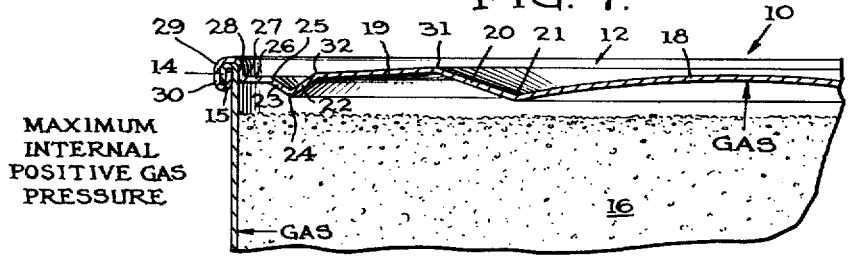

United States Patent Office
3,105,765
Patented Oct. 1, 1963

3,105,765
EVACUATED COFFEE PACKAGE
Robert M. Creegan, Chelmsford, Mass., assignor to General Foods Corporation, White Plains, N.Y., a corporation of Delaware
Filed Feb. 19, 1962, Ser. No. 173,989
3 Claims. (Cl. 99—152)

This invention relates to the packaging under vacuum of roasted and ground coffee, and is concerned more particularly with the construction of the sealed metallic containers which form parts of such evacuated packages. Hereinafter the invention will be described with reference to its embodiment in the well known and widely distributed one pound vacuum-packed can of roasted and ground coffee, but it is to be understood that the invention is not restricted to this particular embodiment.

The usual one pound coffee can is cylindrical in shape and has a height substantially less than its diameter, flexible tin plate steel stock being utilized both for the cylindrical can body and for the end closures which are hermetically sealed to the ends of the can body by suitable means such as rolling the edges of the end closure and of the can body together in a bead or seam. When such containers are evacuated to the desired vacuum, say about 30 inches of mercury, the surrounding atmosphere exerts a pressure of approximately 15 lbs. per square inch on the walls of the container which must be strong enough to withstand the total pressure without collapse. The cylindrical wall may be subject to "paneling" under such external pressure, and may be dented by even a slight force or blow on its outer surface, which would mar the appearance of the can and therefore is highly undesirable. A certain amount of inward deflection of one or both end closures is to be expected, however, and is not objectionable provided of course that no rupture of the metal takes place. In fact, at high vacuum of the order of 30 inches of mercury for example, inward deflection of the end wall is sufficient in many cases to bring it into contact with the mass of roasted and ground coffee by which it is then partially supported, and even to maintain the coffee particles as a substantially rigid mass which partially supports the cylindrical wall as well.

Materials such as roasted and ground coffee gradually evolve gases such as carbon dioxide in the evacuated containers, with the result that gas pressure builds up inside the container in opposition to the external atmospheric pressure and often exceeds atmospheric pressure. In such cases, the end walls which originally were deflected inwardly by the external atmospheric pressure are now subjected to an internal differential pressure acting to bulge the can ends outwardly. The can end must then be strong enough to resist outward deflection beyond its adjoining chime, or otherwise the can may rock about the bulged can end. Such rocking, while not necessarily injurious to the coffee within the can, does indicate to the customer that the coffee has not been packed recently. Bulging also makes it difficult to stack the can vertically, and is further associated in the public mind with spoilage. For all of these reasons, bulging is definitely to be avoided.

In view of the above problems, the practice heretofore has always been to use 85 pound or heavier stock for such cans, even though millions of them are used each year in the United States alone so that even a minor reduction in the weight of the tin plate would result in a marked decrease in cost of manufacture. The use of such stock means further that the can end will not be deflected inwardly enough to contact the coffee until a substantial vacuum is produced inside the can. In the interim, the coffee itself affords little or no support to the cylindrical can body, and accordingly the can body has also been made of 95 pound or heavier tin plate in order to avoid "paneling."

In addition to reliance on the use of 85 pound or heavier stock to support the atmospheric pressure, the prior art has paid a good deal of attention to can end shapes specially designed to permit inward deflection of the can end and to resist outward bulging thereof. Most recently, a can end has been used which has been made out of a continuous sheet of 85 pound tin plate stock having a central disc portion that is substantially plane and is surrounded by an upstruck annular toroidal portion, the central disc being joined to the toroid by an angular bend extending around the inner circumference of the toroid. The outer circumference of the toroid, instead of being connected directly to a peripheral margin extending more or less horizontally to the cylindrical can body, terminates in an outwardly and downwardly inclined side which is joined by a bend angle with an upwardly and outwardly inclined wall surrounding the toroid and joined by another bend angle to a flat, substantially horizontal marginal portion connected to the edges of the can body. The two inclined walls thus form a sort of V-shaped groove or trough with the bend at the apex of the V.

Upon evacuation of a container provided with such a can end, when the vacuum becomes great enough, the central disc portion can be moved bodily inward like a diaphragm by a sort of tilting of the toroidal portion with accompanying flexure of the metal both at the bend angle at the inner circumference of the toroid and especially at the bend angle at the apex of the V-shaped groove. The disc itself may also become somewhat concave as viewed from the outside of the can. The extent of such inward deflection, however, has been limited by the strength of the 85 pound stock to a point such that upon building up of internal pressure as above described, the can end returns to its initial condition upon establishment of equilibrium pressures and is then free to bulge outwardly by a reversal of the diaphragm-like action described above in case the internal pressure builds up to a point above atmospheric. In cans of this type as heretofore manufactured and used, it has been considered necessary to employ tin plate of 85 pound gauge in order to provide enough strength to avoid the risk of excessive bulging.

The primary objects of the present invention are to provide a novel evacuated package including a container and roasted and ground coffee therein, wherein the container ends, and preferably the cylindrical body as well, are made from substantially lighter weight gauge metal than has been used heretofore; wherein the can end is capable not only of inward deflection greater than that of the heavier gauge can ends for the same amount of vacuum or external pressure differential, but also will begin to deflect inwardly at a much lower vacuum; and wherein bulging of the can end upon the development of internal pressure differential is limited so as not to exceed substantially that which occurs with heavier gauge metal heretofore used.

These and other objects, features and advantages of the present invention will become more apparent when considered in connection with the illustration of a specific embodiment thereof in the accompanying drawings, which form a part hereof, and in which:

FIGS. 4 to 7 are vertical sectional views along the line 4—4 of FIG. 3, illustrating the positions assumed by the container end and its contents under various pressures and vacuums within the container.

Figure 1:
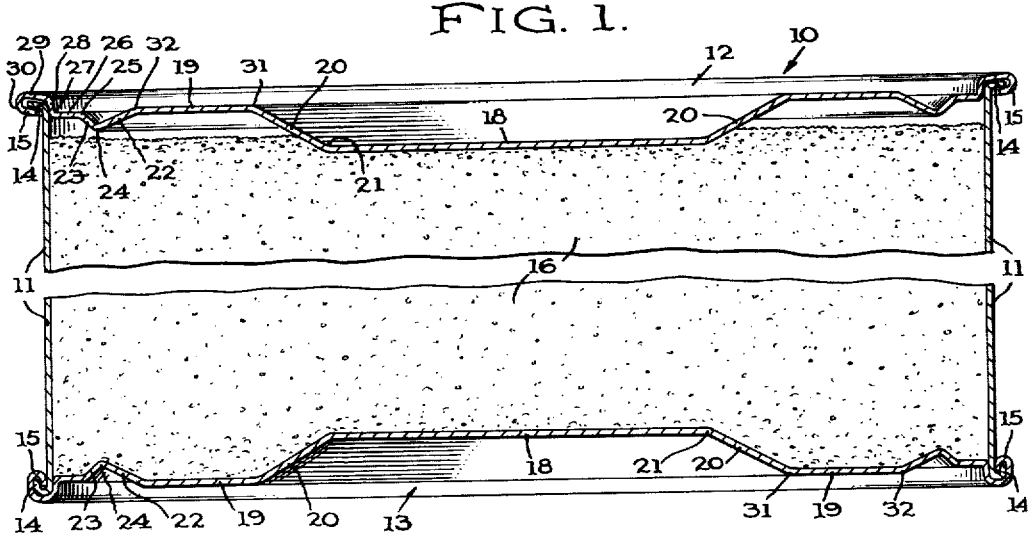
FIG. 1 is a vertical sectional view of a stage in the manufacture of a package embodying the present invention, i.e., prior to evacuation and sealing, the package comprising a metal container of the type discussed above, and being substantially filled with granular contents, for example, ground and roasted coffee.

Referring now particularly to FIG. 1, a can indicated generally by a reference numeral 10 is formed from tin plate steel in its entirety, and comprises a generally cylindrical body 11, an upper end or closure member 12, and a lower end or closure member 13. It will be understood that while these ends are preferably the same as a matter of convenience, it is not necessary for the profile described below to be used at both ends of the can. The ends 12 and 13 are hermetically sealed to body flanges 14 by means of cooperating end flanges 15 and by conventional rolling or beading operations. At the top of FIG. 1 and in FIG. 4, the flanges 14 and 15 are ready for sealing but still not sealed; at the bottom of FIG. 1 and in FIGS. 5 to 7 these flanges have been rolled over and sealed. Within the container 10 is a quantity of ground coffee 16, which is shown in FIG. 1 before the can has been vibrated or otherwise shaken to any substantial extent. Prior to such shaking, the roasted and ground coffee substantially fills the can except for annular spaces formed by and just below the upper can end 12, to be described more fully hereinafter. By virtue of the force of gravity, the coffee completely overlies and presses against the lower container end 13.

Figure 2:
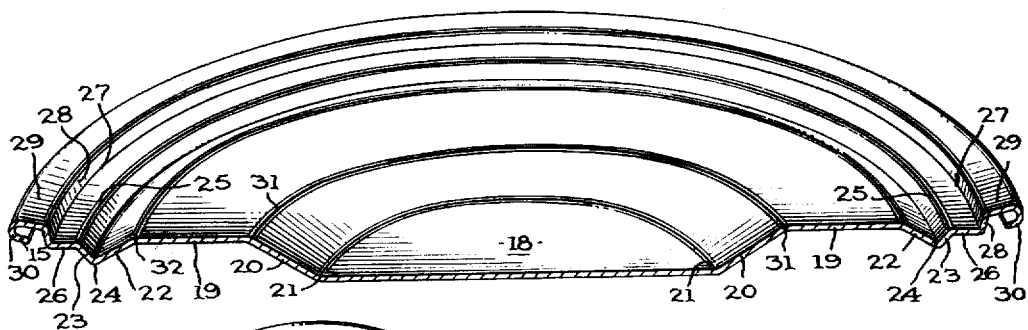
FIG. 2 is a perspective view, in section, of one end of the container of FIG. 1, before application to the can body.
Figure 3:
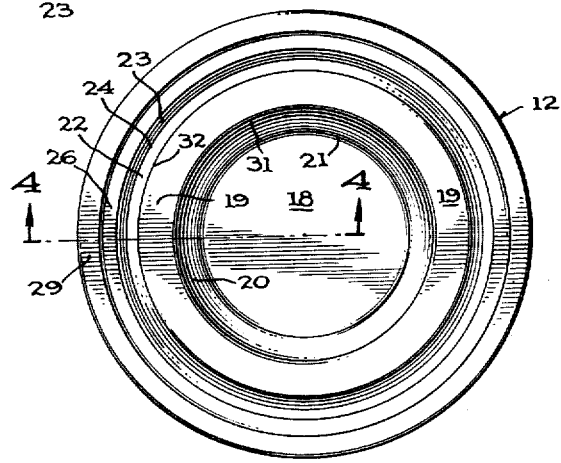
FIG. 3 is a top plan view of the package of FIG. 1.

As seen particularly in FIG. 2, the can end 12 as initially formed has a substantially flat diaphragm-like central portion 18 which is circular in shape. Proceeding from this central portion 18 toward the periphery of the can end, an upstruck toroidal portion 19 is formed around the central disc 18, the inwardly and downwardly inclined side 20 of this toroidal portion being connected to the central disc 18 along a bend line 21 extending around the inner circumference of the toroid. The outwardly and downwardly inclined side 22 of the toroid 19 is connected to an outwardly and upwardly inclined portion 23, the two portions 22 and 23 being angularly related and forming a sort of V-shaped groove or trough the apex 24 of which comprises the bend angle between the portions 22 and 23 and extends around the outer circumference of the toroid.

The portion 23 is connected to marginal portions of the can end which extend outwardly therefrom and are sealed to the rim of the cylindrical can body after evacuation as hereinafter described. In the initial form of the end as shown in FIG. 2, the upper edge of the upwardly and outwardly inclined portion 23 is connected along a bend line 25 with a surrounding marginal portion 26, and the latter is connected around its outer periphery by the bend line 27 with an upwardly inclined portion 28, a surrounding approximately horizontal chime portion 29 and a depending flange 30.

When the can end is placed on the end of the can body and the flange 15 is bent under the flange 14 of the can body as shown at the top of FIG. 1, the can is not hermetically sealed. However, after evacuation, a seam like that shown at the bottom of FIG. 1 (and in FIGS. 5-7 as well) is formed by rolling the chime portion 29 downwardly together with the overlapping flange 14, thereby turning the flange 15 upwardly between the flange 14 and the container wall to form a bead. In this final condition the wall portion 28 of the can end fits inside and is closely juxtaposed against the vertical cylindrical wall of the can body 11, and the wall portion 26 is disposed substantially horizontally so that in the completed package the can end 12 has the form shown at the bottom of FIG. 1 and in enlarged detail in FIGS. 5, 6 and 7. In this condition flexure of the metal can take place at any of the bend lines 21, 24, 25 and 27. Morever, in the form shown wherein the top of the toroidal portion 19 is flattened, additional bend lines 31 and 32 are formed which are also capable of flexing as hereinafter described.

The displacements of a can end 12 such as described above under the various pressure differentials that can occur in an evacuated package of ground roasted coffee are illustrated in detail by FIGS. 4 to 7 of the drawings. With reference to these figures, however, it should be understood that the flexure of the various parts of the can end that result from a given pressure differential may vary somewhat from can to can, and that the drawings are typical in this respect. It is to be understood also that the amount of actual deflection shown in these FIGURES may be somewhat exaggerated as compared with the average can, in order to illustrate more clearly the results of the invention.

The enlarged view of FIG. 4 shows the can substantially filled with coffee and the can end 12 in place, but prior to drawing a vacuum within the can, the seam at the top of the can not yet being completed as at the top of FIG. 1. When the can is so filled with coffee, the central portion 18 of the can end is in contact with the mass of coffee 16, as in standard coffee packaging methods. During shipment of the can and handling incident thereto, however the coffee may settle below the level shown in FIGS. 1 and 4 due to shaking and vibration and when the can is opened, it generally will be found that the level of coffee is below the can end as described hereinafter.

FIG. 5 illustrates the can end after a maximum vacuum approaching 30 inches of mercury has been drawn within the can so as to depress the central portion 18 against the body of ground coffee 16. This pressure tends to compress the mass of coffee particles into a more or less rigid condition and to exert pressure laterally against the can body 11, or at least to afford lateral support to the can body, so as to resist paneling or denting, as well as to support the can end itself against excessive depression. At the same time the decreased volume within the can due to the depression of the can end causes the ground coffee to be forced upwardly so as to fill substantially completely the space underneath the toroidal portion 19 and the marginal portion 26 of the can end.

In assuming the position shown in FIG. 5, the profile of the can end changes form in material respects. It will be seen that in the course of depressing the diaphragm-like central portion 18 to a lower level, some bending or metal flexure of the horizontal marginal portion 26 around the corner or bend line 27 may take place, but a large part of flexure needed to permit such depression occurs at the bend line 24, the inclined surface 22 of the toroidal portion bending about this line in a clockwise direction so as to increase the angle between the walls of the V-shaped groove referred to above. Inspection of the drawings will show further that this depression of the central portion 18 must also cause some flexure at the lines 31 and 32 of the toroid, flattening it out to some extent and causing the previously horizontal flat top 19 thereof to have an inwardly and downwardly inclined slope which substantially depresses the bend line 21 and with it the central portion 18. Of course, some bending must obviously occur along the bend line 21, and the external pressure differential may be great enough as shown in FIG. 5 to cause some concavity of the central disc 18 as viewed from the outside of the package.

From what has already been said, it will be understood that the amount of depression of the central disc 18 as shown by comparison of FIGS. 4 and 5 is substantially greater than would occur with a can end of the same initial profile but of heavier gauge stock. When lighter gauge stock having about the flexibility of 75 pound tin plate steel, say about 65 pound but below 85 pound stock is employed, moreover, it has been found that the amount of deflection illustrated by FIG. 5, particularly at the bend line 24, is so large that when the internal pressure due to the evolution of carbon dioxide gas by the coffee subsequently builds up to equal the external atmospheric pressure, and pressure equilibrium is thus restored as shown in FIG. 6, the can end does not return completely to its original condition. In other words, the lighter gauge metal of the can end appears to have been bent along the line 24 so much that it is inherently incapable of returning the wall portion 22 of the V-shaped groove to the position shown in FIG. 4, a permanent widening of the groove having occurred. The wall 22 remains in a partially deflected position intermediate its initial position shown in FIG. 4 and its maximum deflection shown in FIG. 5, and while the toroid 19 is elevated somewhat from the position shown in FIG. 5, it does not return completely to the position shown in FIG. 4. Thus the flattened top of the toroid as seen in FIG. 6 retains some of the inward and downward inclination that it had in FIG. 5. As a result, the central disc portion 18, while returning to planar condition, and while being elevated somewhat from the position shown in FIG. 5, still remains lower than the position shown in FIG. 4 by a material amount. That is, the central portion 18 is now disposed downwardly to a greater extent than it was before the vacuum was drawn and the volume of the void space below the marginal portion 26 and toroid 19 is reduced.

Further evolution of carbon dioxide from the roasted and ground coffee may cause the gas pressure within the container to become greater than the atmospheric pressure outside the container so that there is an internal pressure differential tending to cause bulging. As this differential increases, the central portion 18 is forced away from the mass of granular coffee 16, FIG. 7 illustrating the profile finally reached when a maximum internal pressure has been developed. A certain amount of elevation of the central portion 18 and its circumferential bend line 21 occurs by flexure of the bend line 26, but the wall 22 is now highly resistant to bending in a counter clockwise direction about the bend line 24, and the elevation of the central portion appears to take place principally by flexure on the bend line 25. Also the top of the toroid can flex about the line 32 so that it now assumes an inwardly and upwardly inclined position as shown in FIG. 7, in contrast to the inwardly and downwardly inclined position of FIG. 5. The result is that the bend line 31 is elevated from the substantially depressed position shown in FIG. 5 back substantially to its original elevation shown in FIG. 4, but not materially above this original elevation. Thus although the central portion 18 may assume a bulged form, being now outwardly convex as shown in FIG. 7 rather than outwardly concave as shown in FIG. 5, nevertheless the profile is such that this bulged central portion 18 does not extend above the plane of the uppermost surface of the chime 29.

When a can 10 is substantially filled with ground coffee (as shown in FIGS. 1 and 4) prior to the drawing of a vacuum, the coffee in the can may be contacted eventually by the can end 12 although conventional 85 pound stock is utilized in forming the can end. However, in drawing a vacuum when 75 pound tin plate steel is used in accordance with the present invention, it has been found that the coffee in the can is urged against and supports the body 11 of the can by the can end 12 as soon as the vacuum being drawn in the can increases to about 7 inches to 10 inches of mercury. The requisite support is obtained so soon because the can end 12, being formed from a lighter gauge of metal, flexes inwardly more readily than a heavier gauge end under the application of a vacuum within the can.

Support for the can body by means of the pressure of the roasted, ground coffee against the body 11 is maintained as the vacuum within the can increases to a maximum approaching 30 inches of mercury. Thereafter, as the carbon dioxide is released from the ground coffee during storage, the vacuum within the can is reduced. It has been found that the central portion 18 of a 75 pound can end will withdraw from contact with the coffee at about 4 inches of vacuum within the can.

Accordingly use of a relatively light, more readily flexible metal for forming a can end 12 according to the present invention makes possible a marked reduction in the gauge of tin plate steel required for forming the body 11 of the container 10. Thus, where the conventional tin plate steel required for forming the body of a conventional coffee can is 95 to 100 lb. plate, use of a 75 lb. plate end makes possible the utilization of a can body from 75 to 85 lb. plate. This saving is made possible because the lighter weight end supports the can body over a wider range of internal can pressures, thereby mitigating the strength requirement necessary when the unsupported can body, alone, must withstand external pressure differentials such as those existing at vacuums substantially greater than 7 inches of mercury.

A lighter weight end according to the present invention thus combines the highly desirable features of markedly resisting outward flexure and supporting the container body over a wider range of internal subatmospheric pressures. These features also result in improved economy of container manufacture.

Advantageously, a lighter weight can end having at least one properly formed joint therein will be deformed at that joint by maximum atmospheric pressures within the can so that the joint will not resume its original shape when the internal can pressure again equals the ambient atmospheric pressure. In a heavier weight end the heavier gauge metal tends to resist such deformation and to reassume its original shape when the internal can vacuum is dissipated. Outward flexure in the lighter weight end is thus resisted by the deformed joint, which is not the case with the heavier weight end.

By the provision of a lighter weight end the weight requirement for the body of the can is also reduced. Because that body is supported by the granular coffee in the can at an earlier point in the drawing of an internal vacuum and at a later point as positive pressure builds up within the can, the can body alone need only withstand lesser subatmospheric pressures there within.

While the present invention has been described with particular reference to a specific embodiment thereof, it will be understood that the invention is not to be limited to such embodiment. Its scope is intended to be defined only by references to the following appended claims.

This application is a continuation in part of my prior application Serial No. 66,780 filed November 2, 1960 and now abandoned.

What is claimed is:

1. An evacuated package of roasted and ground coffee, said package comprising a cylindrical container body, closure member for its ends, and a mass of roasted and ground coffee in said container body, one of said closures being formed of a continuous sheet of flexible relatively light-gauge metal having an upstruck annular toroidal portion and a surrounding marginal portion, said two portions being connected by interposed angularly related walls forming a groove of approximately V-shaped cross-section extending annularly around said toroidal portion, and a substantially plane central disc portion joined to the surrounding toroidal portion along a bend at the inner circumference of said toroidal portion, said marginal portion being sealed to the end of said body and said central disc portion being depressed below its initial level relative to said marginal portion with flexing of said bends and increase of the angle between the walls of said groove as the result of evacuation of the container, said depressed central portion contacting and compressing said mass of ground coffee into a substantially rigid body filling said container in supporting contact with its side and end walls, said sheet having the approximate flexibility of 75 pound tin plate steel and the angle between the walls of said groove being increased with accompanying flexure of the metal around the bottom of the groove beyond its capacity to return said walls to their original angular relation in the absence of differential pressure on said end.

2. A package as claimed in claim 1, said closure member being formed entirely from 75 pound tin plate steel.

3. A package as claimed in claim 2, said cylindrical body being formed entirely from 75–85 pound tin plate steel.

References Cited in the file of this patent

UNITED STATES PATENTS

| | | |
|---|---|---|
| 1,963,795 | Lang | June 19, 1934 |
| 1,987,817 | Burns | Jan. 15, 1935 |
| 2,012,213 | Young | Aug. 20, 1935 |

UNITED STATES PATENT OFFICE
CERTIFICATE OF CORRECTION

Patent No. 3,105,765            October 1, 1963

Robert M. Creegan

It is hereby certified that error appears in the above numbered patent requiring correction and that the said Letters Patent should read as corrected below.

In the grant (only), line 1, name of inventor, for "Robert M. Greegan" read -- Robert M. Creegan --; column 4, line 24, after "however" insert a comma; line 71, for "about" read -- above --; column 6, line 53, for "member" read -- members --.

Signed and sealed this 14th day of April 1964.

(SEAL)
Attest:
ERNEST W. SWIDER

Attesting Officer

EDWARD J. BRENNER

Commissioner of Patents